T. B. JEFFERY, DEC'D.
K. E., C. T. & H. W. JEFFERY, EXECUTORS.
WHEEL.
APPLICATION FILED OCT. 22, 1908.
1,067,430.
Patented July 15, 1913.
2 SHEETS—SHEET 1.
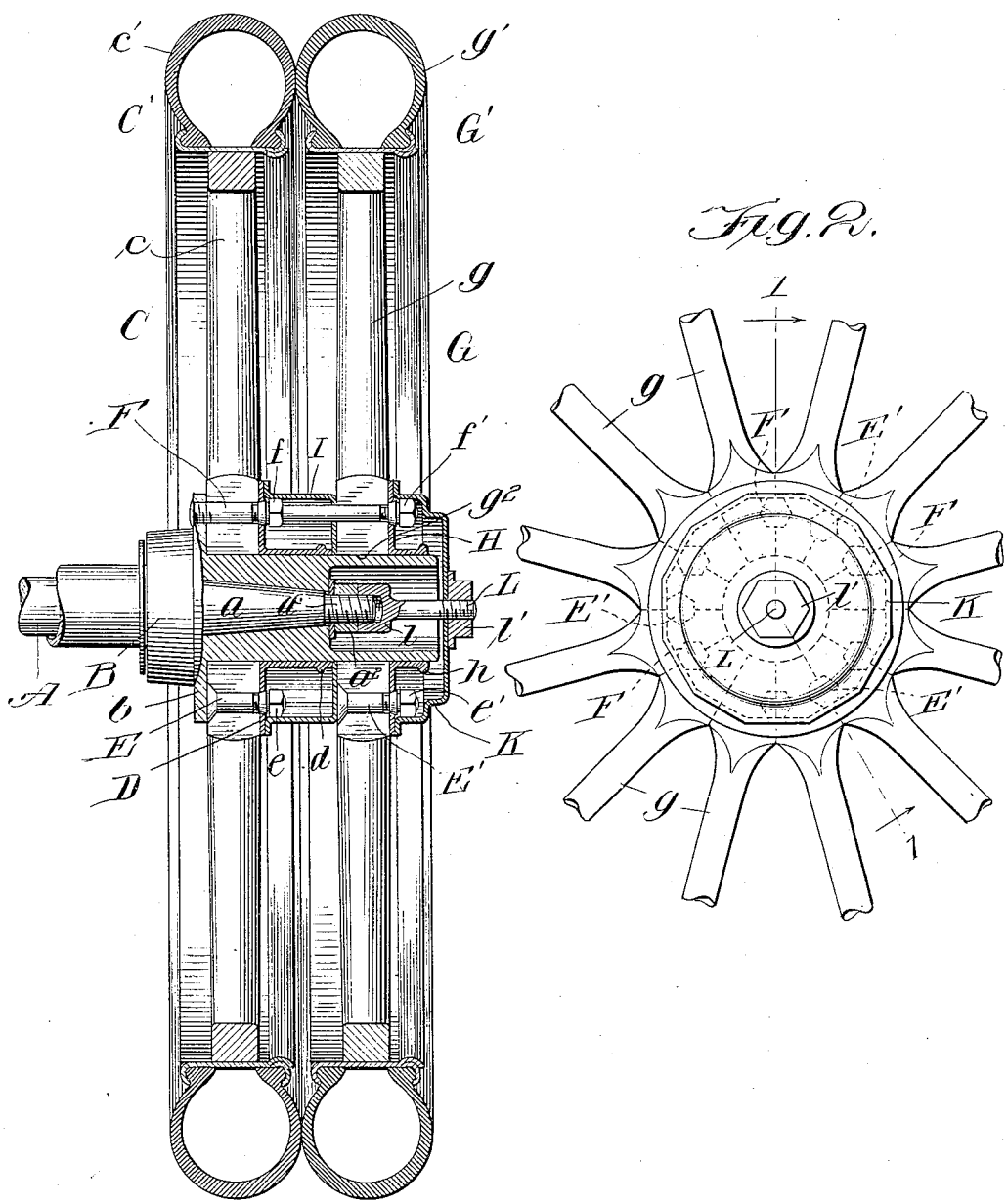
Witnesses:
Harry S. Gaither
Inventor:
Thomas B. Jeffery

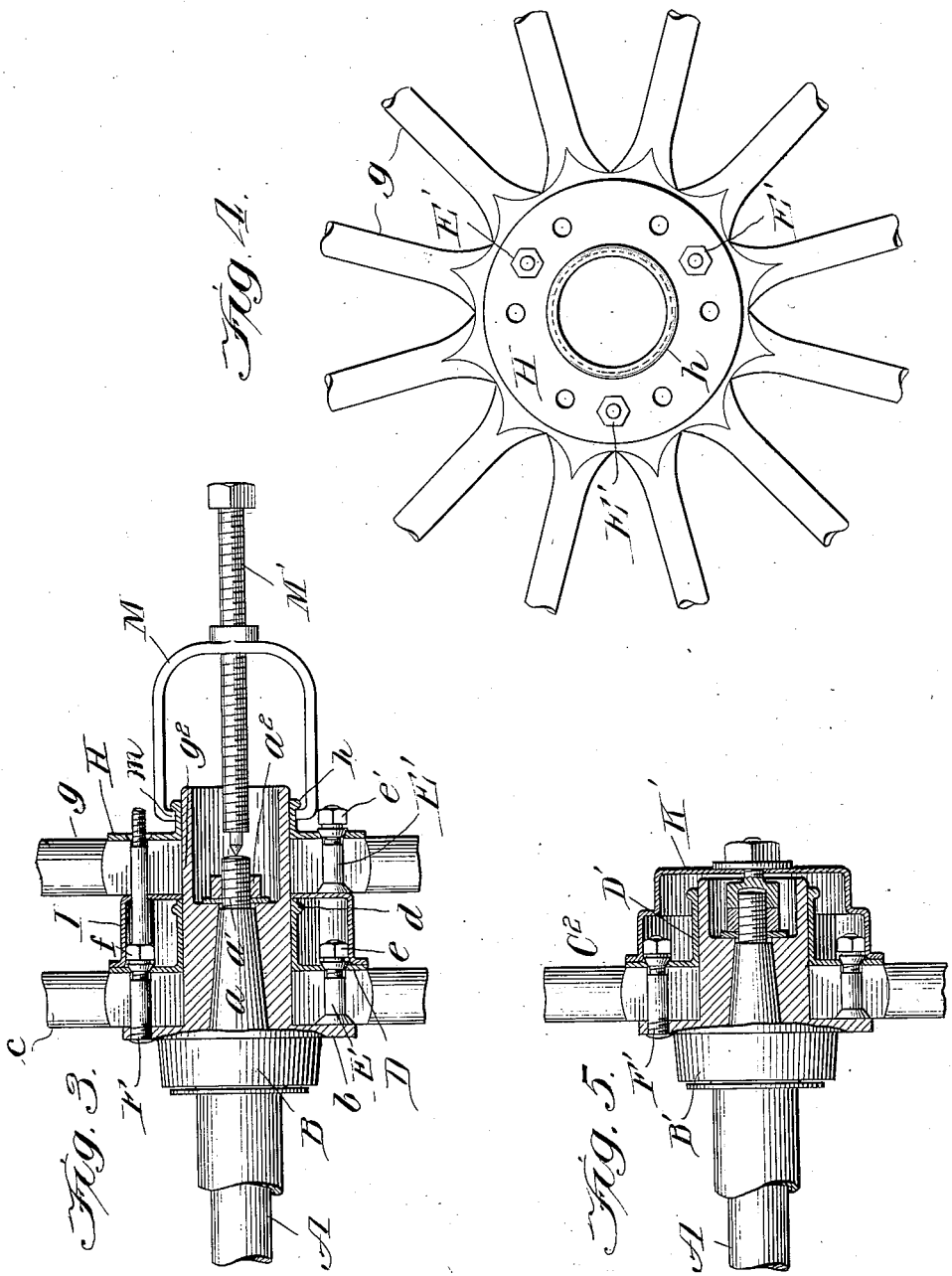

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

WHEEL.

1,067,430.  Specification of Letters Patent.  Patented July 15, 1913.

Application filed October 22, 1908. Serial No. 458,941.

*To all whom it may concern:*

Be it known that I, THOMAS B. JEFFERY, a citizen of the United States, residing at Kenosha, county of Kenosha, State of Wisconsin, have invented a certain new and useful Improvement in Wheels, and declare the following to be a full, clear, and exact description of the same, such as will enable others skilled in the art to which it pertains to make and use the same, reference being had to the accompanying drawings, which form a part of this specification.

It is an almost universal practice to carry upon an automobile or the like one or more extra tires or tires and rims for the purpose of replacing damaged tires. It is often very difficult to place a new tire in position in the open where the best appliances for this purpose are not at hand, and the use of detachable rims, while increasing the certainty that a tire may be replaced under adverse conditions, adds to the complexity of the wheels and produces the disadvantages which naturally result from such complexity. It has been proposed, in order to obviate the difficulties attendant upon the use of detachable tires and detachable rims, to employ wheels which are in themselves detachable so that in order to replace a damaged tire an entire new wheel is substituted for the wheel having the damaged tire.

My invention has for one of its objects to produce a simple and novel arrangement wherein a wheel body may be readily removed from its hub and replaced by another wheel body similar thereto or of a different kind.

A further object of my invention is to produce a wheel wherein the body may readily be detached from the hub without leaving the wheel body in a weakened condition which may result in the wheel body being damaged when carried as an auxiliary device for replacing a wheel body which has become broken or whose tire may have become useless.

A further object of my invention is to produce a simple and novel double wheel having two independent tread surfaces.

The various features of novelty which characterize my invention will hereinafter be pointed out with particularity in the claims; but, for full understanding of my invention and of its various objects and advantages, reference may be had to the following detailed description taken in connection with the accompanying drawings, wherein:

Figure 1 is a section taken on line 1—1 of Fig. 2 showing a preferred form of my invention embodying the double wheel construction. Fig. 2 is a side view of the wheel shown in Fig. 1, the rim and tire being omitted; Fig. 3 is a view similar to the central portion of Fig. 1 showing one of the wheels in the process of removal; Fig. 4 is a view similar to Fig. 2 showing the wheel body removed from the hub; and Fig. 5 is a view corresponding to Fig. 1, showing, however, only a single-wheel construction.

Referring to the drawings, A represents an axle having a cone-shaped end $a$.

B is a hub detachably fitted upon the end of the axle. This hub has upon its inner end an annular shoulder $b$.

C is a wheel consisting of a series of radiating spokes $c$, and a rim device $C^1$ surrounding the spokes and including the tire $c^1$. The inner ends of the spokes are shaped so as to form a central opening $c^2$ sufficiently large to receive the hub.

D is a hub flange of usual construction lying against one face of the spokes and surrounding the hub. In accordance with my invention the hub flange is fastened permanently to the wheel body, as, by means of bolts E which pass through the flange and the inner ends of the spokes. The flange accordingly forms a permanent part of the wheel body. In order to secure the wheel body upon the hub, I make use of a second set of bolts, F, these bolts passing not only through the flange and the spoke ends but also into or through the shoulder $b$ on the hub.

G is a second wheel body made up of spokes $g$ and a rim device $G^1$ including a tire $g^1$. The inner ends of the spokes form a central opening $g^2$ similar to the opening $c^2$ in the other wheel.

H is a hub flange similar to the flange D and connected to the spokes $g$ by means of bolts $E^1$. This second wheel may conveniently be secured in place by extending the bolts F sufficiently to permit them to pass entirely through the spokes and the hub flange of the second wheel. Furthermore, a spacing device I may be placed between the two wheels so that when the nuts $f$ and $f^1$ are tightened the wheel C is drawn against the shoulder on the hub and the wheel G and the spacing device are forced toward the companion wheel. The spacing device may conveniently be made to serve as a lock for the nuts $f$ and also for the nuts $e$ by forming the spacing device so as to have a polygonal contour and spacing the bolts at such distances from the center that a flat side of each of the nuts will be against one of the sides of the spacer when the nuts are properly positioned.

K is a hub cap which, like the spacer I, may fit over the nuts $f^1$ and $e^1$ so as to hold them against rotation. The cap may be held in place in any convenient manner as, for example, by means of a bolt L having at one end a screw threaded head $l$ which is screwed upon the end of the axle at $a^1$ and having at its other end a nut $l\ l$ which bears against the outer surface of the cap.

When it is desired to remove the wheel G, the hub-cap and the nuts $f^1$ are removed. The hub flange is provided with a bead or shoulder behind which the toes $m$ of a U-shaped clamp M may be hooked. The clamp is provided with a central screw threaded stud $M^1$ which is turned until the inner end thereof engages with the end of the axle. Upon continuing the turning movement of the stud, the wheel is gradually drawn from the hub, the flange, of course, remaining fixed thereto. A new wheel may now be put in place and, by reason of the permanent attachment of the flanges, there is no danger that the new wheel will have been distorted or that the wheel which is being removed will be injured in any way. If it is desired also to remove the wheel C then, after the outer wheel has been removed, the clamp is engaged with a bead or shoulder $d$ on the flange D and the same operation is performed with the clamp as before, the nuts $f$ having, of course, been first removed. If it is desired to remove the hub from the axle, then, by removing the nut $a^2$ on the end of the axle and leaving the nuts $f^1$ in place, the clamp, when hooked over the shoulder or bead $h$, will act to draw both wheels and their hubs from the end of the axle.

In Fig. 5, I have shown my invention as embodied in a single wheel. The hub $B^1$ may be identical with the hub B, except that it is shorter. The wheel body $C^2$ is the same as it is in the other modification. The flange $D^1$ may be the same as either the flange D or the flange H. The bolts $F^1$ are the same as the bolts F, except that they are not extended farther than is necessary beyond the flange $D^1$. The bolts F and $F^1$ are preferably fixed to the shoulder on the hub so that upon the removal of a wheel or wheels the bolts remain in their normal positions on the hub. There is consequently no danger of losing the bolts or of dropping them upon the roadway and covering them with dirt when it is necessary to remove a wheel out in the open, and substitute therefor a spare wheel. Furthermore, by fixing the bolts to the hub instead of to the wheel itself, it is unnecessary to provide the spare wheel with an extra set of bolts which might become injured so as to make it difficult to apply the spare wheel when desired. The fixing of the bolts may be accomplished in various ways as, for example, by riveting the ends thereof after the bolts have been screwed into the shoulder. The cap $K^1$ is similar to the cap K.

It will now be seen that in each of the modifications there is provided a means which permits of ready and convenient replacement of a damaged tire and also, if the wheel itself be injured, of the wheel, without adding to the complexity of the ordinary wheel structure or weakening the wheel structure in such a way that a wheel carried as an extra wheel is liable to injure it. Furthermore, in the modification illustrated in the first four figures, a powerful wheel structure is produced without making it necessary to have correspondingly large tires. It will be seen that if one of the tires is damaged it is only necessary to replace that tire, the expense being much less than would be the case if a single large tire were employed. Furthermore, in both modifications it is possible to replace a wheel by another wheel having an entirely different kind of tire so that the user does not have to depend upon any particular type of rim structure; nor is it necessary that one set of wheels be always replaced by a set similar thereto, as to size, since it is only necessary that the new wheels have the proper sized hub openings and properly spaced bolt holes.

While I have described in detail only preferred forms of my invention, I do not desire to be limited to these particular forms since in its broader aspects my invention may take various other forms as will be evident from the terms employed in the definitions of my invention considered in the appended claims.

Having now fully described my invention, what I claim as new and desire to secure by Letters Patent is:

1. In combination, a wheel hub having a shoulder, a wheel body comprising radiating spokes and a rim surrounding the spokes, a flange surrounding the hub and lying adjacent to the spokes, bolts passing through the flange and spokes, nuts on said bolts and hub-cap having faces for engaging with the sides of said nuts for preventing them from turning.

2. In combination, a hub having a shoulder, a wheel body arranged upon said hub, bolts passing through said shoulder and said wheel body, nuts on said bolts for forcing said body toward said shoulder, a second wheel body on said hub, a spacer between said wheel bodies, said bolts being extended through said second wheel body, and nuts on said bolts for forcing said second wheel body toward the first wheel body.

3. In combination, a hub having a shoulder, a wheel body arranged on said hub, a sleeve shaped to fit the hub and having an annular flange at one end, bolts passing through the wheel body and said flange to secure the same together, a second wheel body on said hub, a second sleeve shaped to fit the hub and having an annular flange at one end, bolts securing the latter flange to said second wheel body, a series of bolts fixed to said shoulder and passing through both of said wheel bodies and said flanges, and nuts on said latter bolts for forcing both of said wheel bodies toward said shoulder.

4. In combination, a hub having a shoulder, a wheel body arranged on said hub, a sleeve shaped to fit the hub and having an annular flange at one end, bolts passing through the wheel body and said flange to secure the same together, a second wheel body on said hub, a second sleeve shaped to fit the hub and having an annular flange at one end, bolts securing the latter flange to said second wheel, a spacer between said wheel bodies, a series of bolts fixed to said shoulder and passing through both of said wheel bodies and said flanges, and nuts on said latter bolts for forcing both of said wheel bodies toward said shoulder.

In testimony whereof, I sign this specification in the presence of two witnesses.

THOMAS B. JEFFERY.

Witnesses:
  GEO. L. TROUVIG,
  GEO. H. EDDY.